United States Patent [19]

Heckman

[11] Patent Number: 4,619,047
[45] Date of Patent: Oct. 28, 1986

[54] MEAT TRIMMING KNIFE WITH WRIST STRAIN RELIEF DEVICE

[75] Inventor: Sandy D. Heckman, Memphis, Tenn.

[73] Assignee: John Morrell & Company, Northfield, Ill.

[21] Appl. No.: 698,826

[22] Filed: Jan. 31, 1985

[51] Int. Cl.[4] .............................................. B26B 7/00
[52] U.S. Cl. ...................................... 30/276; 17/1 G
[58] Field of Search ............... 16/1 R, 110 R, 113, 16/DIG. 25; 17/1 G, 46, 66; 30/231, 232, 276, 291, 296 R, 297, 298; 294/25

[56] References Cited

U.S. PATENT DOCUMENTS

| 607,154 | 7/1898 | Berck | 294/58 |
| 712,843 | 11/1902 | Paul | 30/296 R |
| 2,482,589 | 9/1949 | Maguire | 294/58 |
| 3,024,532 | 3/1962 | Bettcher | 30/276 |
| 3,461,557 | 8/1969 | Behring | 30/276 |
| 3,751,804 | 8/1973 | Pulrang | 30/169 |
| 4,179,805 | 12/1979 | Yamada | 30/122 |

FOREIGN PATENT DOCUMENTS 2027324  2/1980  United Kingdom .................. 30/276

Primary Examiner—James M. Meister
Assistant Examiner—Michael D. Folkerts
Attorney, Agent, or Firm—Wood, Dalton, Phillips, Mason & Rowe

[57] ABSTRACT

A wrist strain relief device for a meat trimming knife which has a member connected to a manually-held knife body and positioned to engage a user's forearm. The forearm is a reaction member to the manually-applied downward force at the knife blade to take pressure off the user's wrist.

4 Claims, 3 Drawing Figures

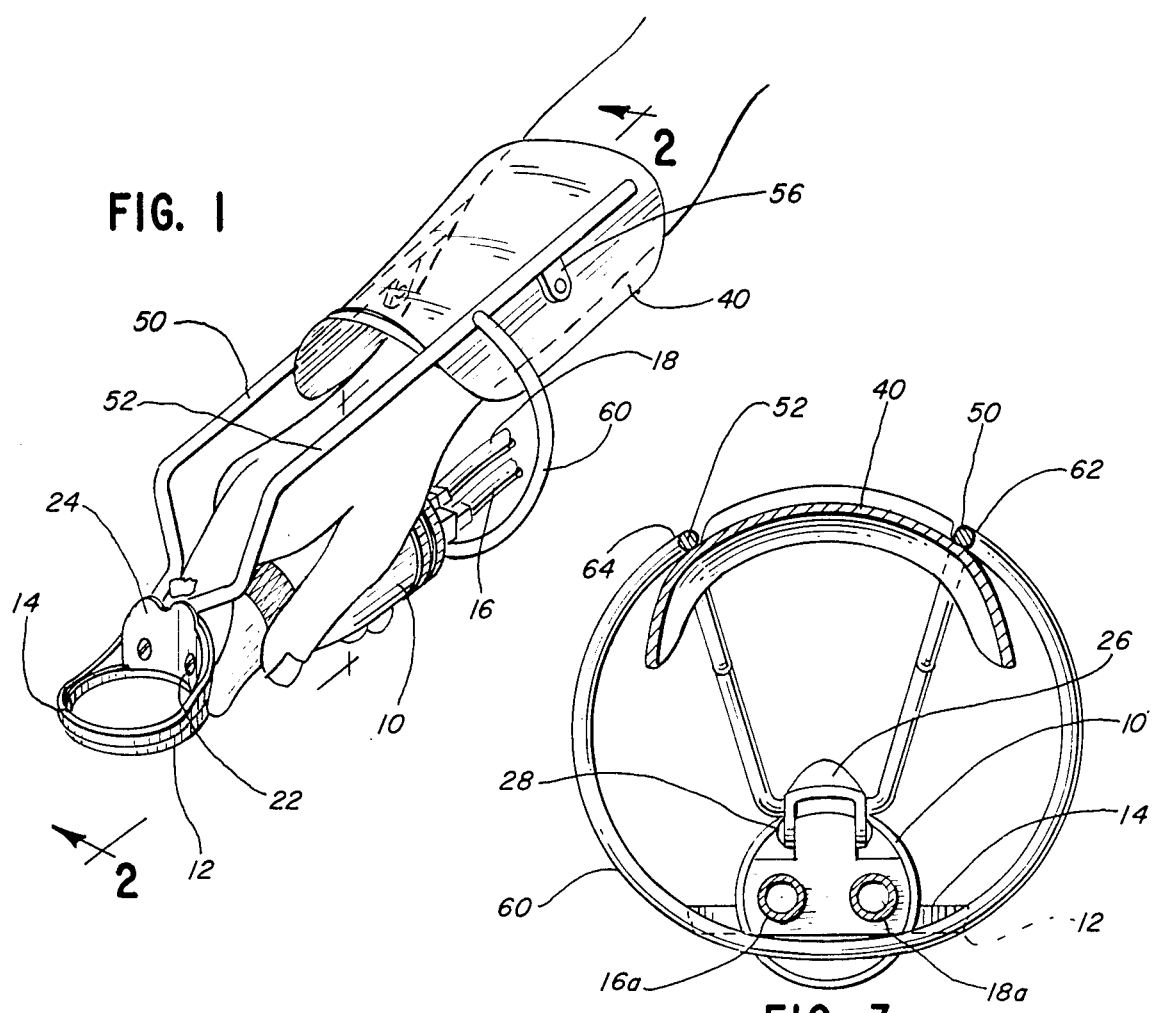
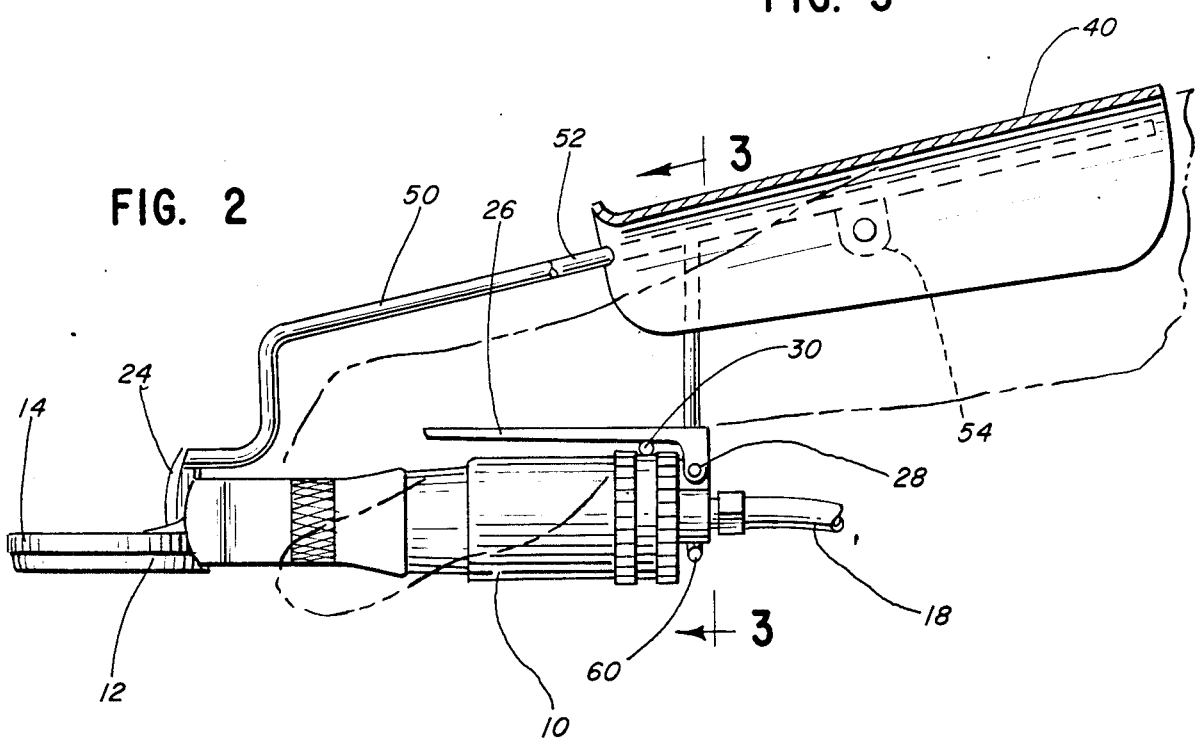

MEAT TRIMMING KNIFE WITH WRIST STRAIN RELIEF DEVICE

BACKGROUND OF THE INVENTION

This invention pertains to a wrist strain relief device for association with a hand held tool. More particularly, the invention pertains to a forearm-engaging member associated with a meat trimming knife to reduce pressure on the wrist of a user and reduce the likelihood of the user incurring the disability commonly known as carpal tunnel syndrome.

The meat industry has many uses for a hand held trimming knife wherein a manually-applied downward force and knife movement causes a motor-driven knife blade to perform a cutting operation. Such a knife is used in trimming fat from meat and can also be used for slicing and removing meat from bones. One showing of a knife of this general type is in the Bettcher U.S. Pat. No. 4,170,063 wherein the knife has a manually-grippable cylindrical body and a knife mounting at one end which mounts a circular knife blade. The circular knife blade is motor-driven, such as by an air motor mounted within the knife body.

The knife is normally used by manually gripping the knife body and exerting a downward force to press the circular knife blade downwardly against the meat and the knife is drawn toward the operator to perform the desired cutting, such as fat trimming.

The use of the meat trimming knife has resulted in a common workers' compensation disability, known as carpal tunnel syndrome. The carpal tunnel is a channel in the wrist through which important nerves, blood vessels and tendons pass into the hand. Carpal tunnel syndrome is caused by compression of the median nerve as it lies beneath the flexor retinaculum in the carpal tunnel. The flexor retinaculum is made up of two bands of ligaments which surround the wrist. The use of the meat trimming knife results in pressure at the wrist and the whole hand can be bent backwards. This pressure and bending can result in carpal tunnel syndrome.

Carpal tunnel syndrome results in unusual sensations in either the wrist or several fingers of the hand, such as burning, itching, prickling, or gingling, with usually some sensory disturbance in the fingers. In severe cases, certain muscles of the thumb can atrophy and there is an over-all weakness of the hand. The median nerve can also be affected. Carpal tunnel syndrome has resulted in payment of hundreds of thousands of dollars a year in workers' compensation injuries for at least one meat packer and this problem is prevalent throughout the meat packing industry.

The invention to be described hereinafter enables the use of a meat trimming knife in a manner which will remove pressure from the wrist to minimize the likelihood of carpal tunnel syndrome.

SUMMARY OF THE INVENTION

A primary feature of the invention is to provide a wrist strain relief device for use with a hand tool whereby a downward force applied to the manually-grippable hand tool is reacted against a forearm-engaging member connected to the hand tool to relieve pressure on the wrist of a user of the hand tool.

Another feature of the invention is to provide a wrist strain relief device for a hand tool in the form of a meat trimming knife having a manually-grippable cylindrical knife body with a knife blade mounted at one end thereof and with a forearm-engaging member positioned at a distance from the opposite end of the cylindrical knife body and at a location above a plane extending longitudinally through the knife body and the knife blade. A manually-applied downward cutting force transverse to said plane is reacted through the forearm-engaging member against an upper side of the forearm to take pressure off the wrist of the user.

A further feature of the invention is to provide a method of cutting or trimming meat by a hand-held meat trimming knife comprising exerting a downward cutting force on a knife blade by downward force exerted on a manually-grippable knife body and reacting said downward cutting force on the upper part of a meat cutter's forearm to relieve pressure on the wrist of the meat cutter.

An object of the invention is to provide a hand held meat trimming knife having a wrist strain preventing device comprising, a manually grippable cylindrical knife body, a knife mounting extending beyond one end of said knife body, a circular knife drivingly mounted in said knife mounting and having a cutting action by movement along a workpiece and pressure resulting from a manually-applied downward force, and a forearm-engaging force reaction means to relieve pressure on a user's wrist including an arcuate downwardly concave elongate shield for overlying a user's forearm, and a mounting frame connecting said shield to said knife body.

Still another object of the invention is to provide a hand knife as defined in the preceding paragraph wherein said mounting frame comprises a pair of spaced rods to minimize the weight of the mounting frame, and an arm-encircling ring connected to said mounting frame and positioned for selective engagement with said knife body.

A further object of the invention is to provide a hand knife as defined in the preceding paragraph wherein one end of said rods are attached to a mounting plate and said mounting plate is secured to said knife body by the means which attaches the knife mounting to the knife body.

BRIEF DESCRIPTION OF THE DRAWINGS

FIG. 1 is a perspective view of the wrist strain relief device and meat trimming knife in association with a user's hand and forearm and positioned for use;

FIG. 2 is a view, partly in elevation and partly in section, of the structure shown in FIG. 1, taken generally the line 2—2 in FIG. 1; and FIG. 3 is a sectional view, on an enlarged scale, taken generally along the line 3—3 in FIG. 2.

DESCRIPTION OF THE PREFERRED EMBODIMENT

The hand tool in the form of a meat trimming knife has a generally cylindrical knife body 10 which is hand-grippable, as seen in FIG. 1. The knife body 10 has an interior cavity housing a motor (not shown) for rotating a circular knife blade 12 carried by a knife mounting 14. The motor within the knife body 10 can be an air-driven motor and hoses 16 and 18 connect to hose fittings 16a and 18a at an end of the knife body.

Meat trimming knives are extensively used in the meat packing industry. A typical construction is that shown in the previously-referred to Bettcher U.S. Pat.

No. 4,170,063 and the disclosure thereof is incorporated by reference.

The cylindrical knife body 10 has the knife mounting 14 at one end thereof and the knife mounting rotatably mounts the circular knife blade 12. The circular knife blade 12 has gear teeth (not shown) about its upper periphery which mesh with a gear driven by the motor within the knife body 10. The knife mounting 14 is detachable from the knife body and is held thereto by a pair of threaded fasteners 20 and 22 extended through openings in the knife mounting 14 and threaded into the knife body 10. These threaded fasteners also secure a mounting plate 24 to the knife body, with the purpose of this mounting plate being further described hereinafter.

The rotation of the knife blade 12 is under the control of a lever 26 pivoted at 28 to the knife body and which can be moved toward the knife body by the hand of a user to open a valve for supplying air under pressure to the air motor within the knife body. The lever 26 acts on a valve-operating plunger 30 movably extending from the knife body 10.

In use of the meat trimming knife, the operator or user grasps the knife body 10 with the hand, as seen in FIG. 1, and exerts a downward force to create cutting pressure at the driven circular knife blade 12 and, at the same time, draws the knife toward the operator's body to achieve the severing action, such as removal of fat. This use results in exertion of pressure at the wrist, with resulting problems, as discussed in the "BACKGROUND OF THE INVENTION".

A wrist strain relief device is associated with the meat trimming knife to relieve the pressure on the user's wrist. This device incorporates a forearm-engaging member, in the form of a downwardly-concave arcuate shield 40 located for contact with the upper side of a user's forearm at a distance from the manually grippable part of the knife body 10 and beyond an end thereof opposite to the end which has the knife mounting 14. The forearm-engaging member 40 is located above a plane extending through the circular knife 12 and lengthwise of the knife body 10 whereby a lever action is created. The forearm-engaging member 40, in engaging the forearm, defines a fulcrum respecting a downward force manually applied at the knife body 10 and a reacting force resulting from pressure applied by the circular knife 12 to the meat. Thus, the forearm-engaging member is a reaction member to the operating pressure resulting from a force manually imposed on the circular blade. The forearm-engaging member is of a shape and size to adapt for use by different persons and to also function as a protective shield.

The forearm-engaging member 40 is supported by the knife body 10 by means of a pair of spaced-apart elongate rods 50 and 52. One end of each of the rods 50 and 52 is secured to the mounting plate 24 in a suitable manner, as by welding, and a substantial part of the rods overlies the arcuate forearm-engaging member 40. Each of the rods has a depending bracket 54 and 56, respectively, for receiving a fastening member which extends through the wall of the forearm-engaging member 40 to secure the rods thereto.

A partial ring 60 has ends 62 and 64 secured to the rods 50 and 52, respectively, and is of a diameter to extend beneath the knife body 10 at the hose fittings 16a and 18a. The rods 50 and 52 are formed from relatively small diameter stock and the arcuate forearm-engaging member 40 may be suitably formed of lightweight plastic whereby the wrist strain relief device adds minimal weight to the hand tool. When a downward force is reacted at the fulcrum defined by the forearm-engaging member 40, there can be some flexure of the rods 50 and 52 and this is limited by engagement of the encircling ring 60 with the underside of the knife body, as is readily evident in FIGS. 2 and 3.

In operation of many hand tools and the meat trimming knife shown particularly in the drawings, a downward force is imparted by the hand of the user and there can be flexing of the wrist during the cutting operation. This imposes pressure and, therefore, strain on the wrist which can result in the carpal tunnel syndrome previously referred to. The wrist strain relief device removes the pressure from the wrist and the reaction to the pressure applied against the meat is taken up by the forearm-engaging member 40 engaging the upper side of the forearm.

The structure disclosed in the application results in a new and improved method of cutting or trimming meat by a hand held meat trimming knife which comprises the steps of exerting a downward cutting force on a knife blade by downward force exerted on a manually gripped knife body and reacting the downward cutting force on the upper part of a meat cutter's forearm to relieve pressure on the wrist of the meat cutter.

In carrying out the method, the knife is moved in a slow, steady motion toward the user's body while the knife is held at a slight angle to the plane of the meat being trimmed and throughout this motion the cutting pressure is reacted at the forearm-engaging member 40 and without flexure of the user's wrist.

I claim:

1. A hand held meat trimming knife having a wrist strain preventing device comprising, a manually-grippable cylindrical knife body, a knife mounting extending beyond one end of said knife body, means connecting the knife mounting to the knife body, a circular knife blade drivingly mounted in said knife mounting and having a cutting action by movement along a workpiece and pressure resulting from a manually-applied downward force, and a forearm-engaging force reaction means to relieve pressure on a user's wrist including an arcuate downwardly concave elongate shield for overlying a user's forearm, and mounting means connecting said shield to said knife body including a mounting plate held to the knife body by said connecting means.

2. A hand knife as defined in claim 1 wherein said mounting means comprises a pair of spaced rods to minimize the weight of the mounting means and an arm-encircling ring connected to said pair of spaced rods and positioned for selective engagement with said knife body.

3. A hand knife as defined in claim 2 wherein one end of said rods are attached to said mounting plate.

4. A hand held meat trimming knife and a wrist strain relief attachment therefor comprising, in combination, a hand-grippable cylindrical knife body with opposite front and rear ends, a knife mounting and a circular knife blade thereon positioned beyond the front end of the knife body, means interconnecting said knife mounting and said knife body to enable downward operating pressure to be exerted by the circular knife blade by a downward force manually applied to the knife body, and said attachment comprising a mounting plate, a pair of spaced-apart rods rigidly connected to said mounting plate and extending upwardly and rearwardly therefrom to overlie said knife body and extend beyond the rear end of the knife body with a space between said rods and knife body to enable positioning of a user's hand in said space for gripping said knife body, a partial ring connected to said rods and extending downwardly therefrom and of a diameter to permit a user's forearm to extend therethrough and with a lower part of the ring being under the rear end of the knife body, and a forearm-engaging downwardly concave arcuate shield rigidly connected to said spaced-apart rods to lie above a plane extending through said knife body and knife blades and having a length to extend a distance rearwardly of said partial ring and by engaging the upper part of the user's forearm provide a force reaction to said downward operating pressure and relieve pressure on the wrist of the user.

* * * * *